July 20, 1926.  1,593,300
S. G. HARWOOD ET AL
VALVE MECHANISM FOR WATER SOFTENING SYSTEMS
Filed March 7, 1925  5 Sheets-Sheet 5

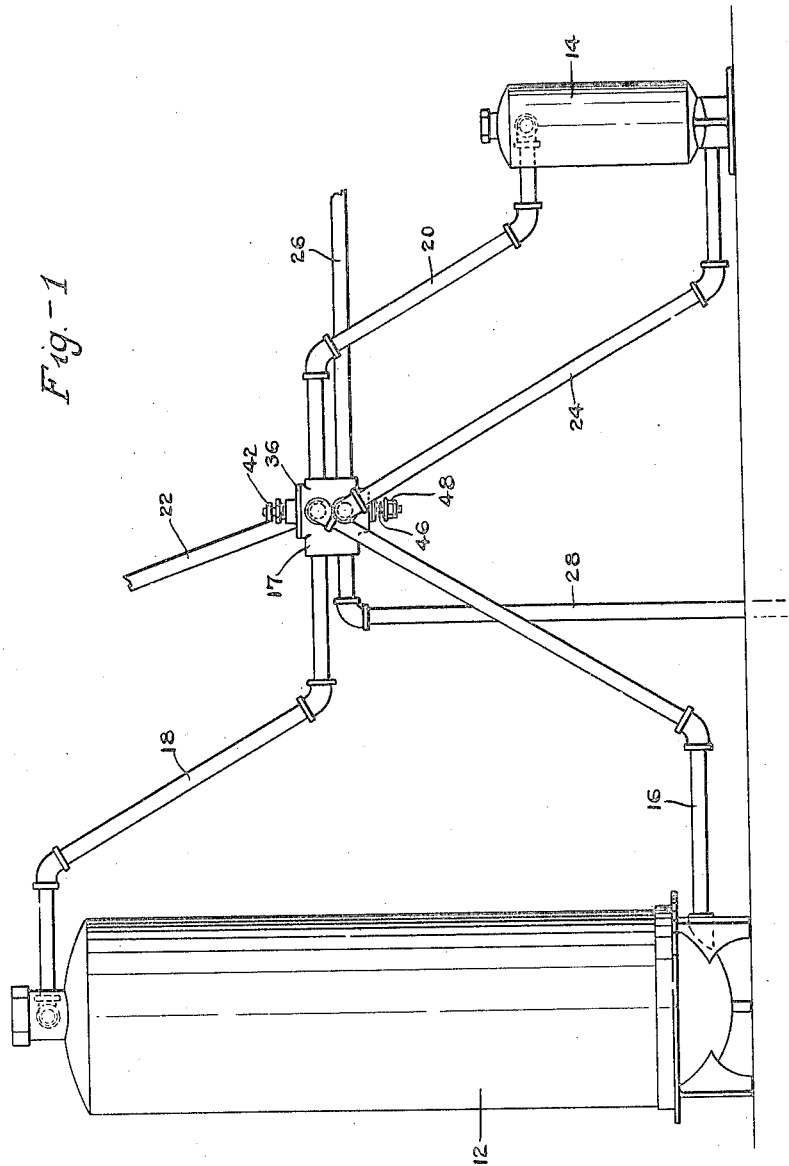

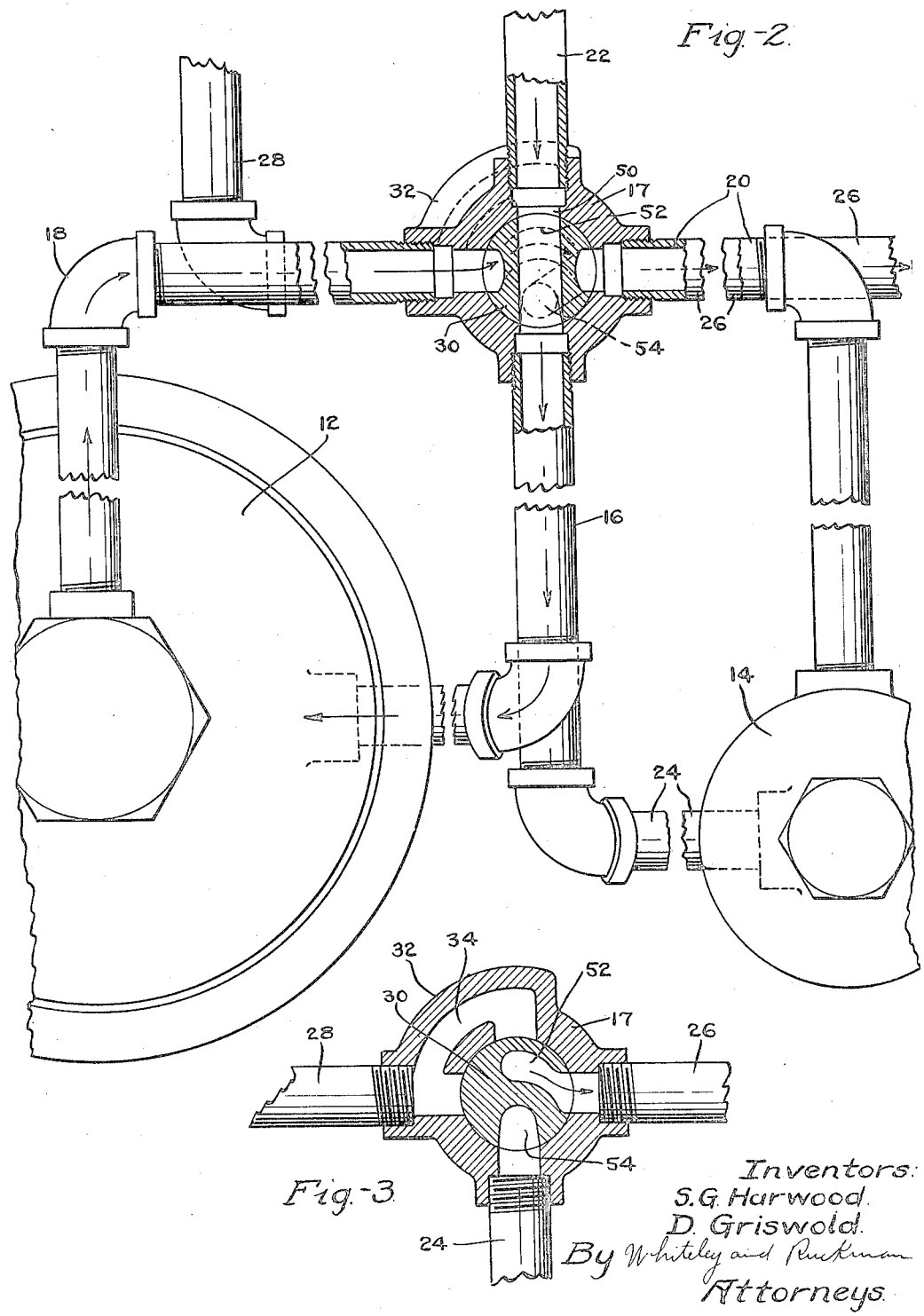

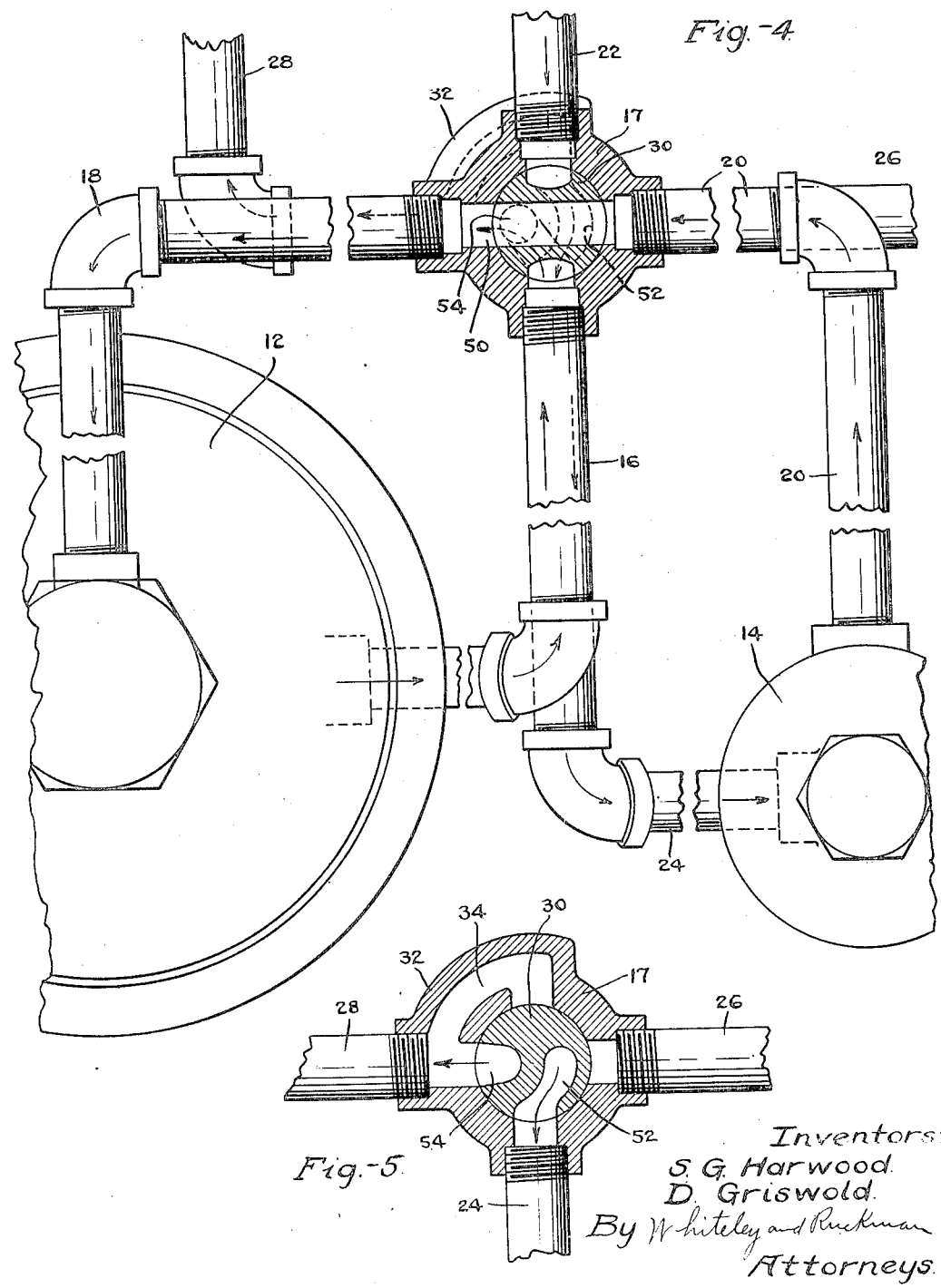

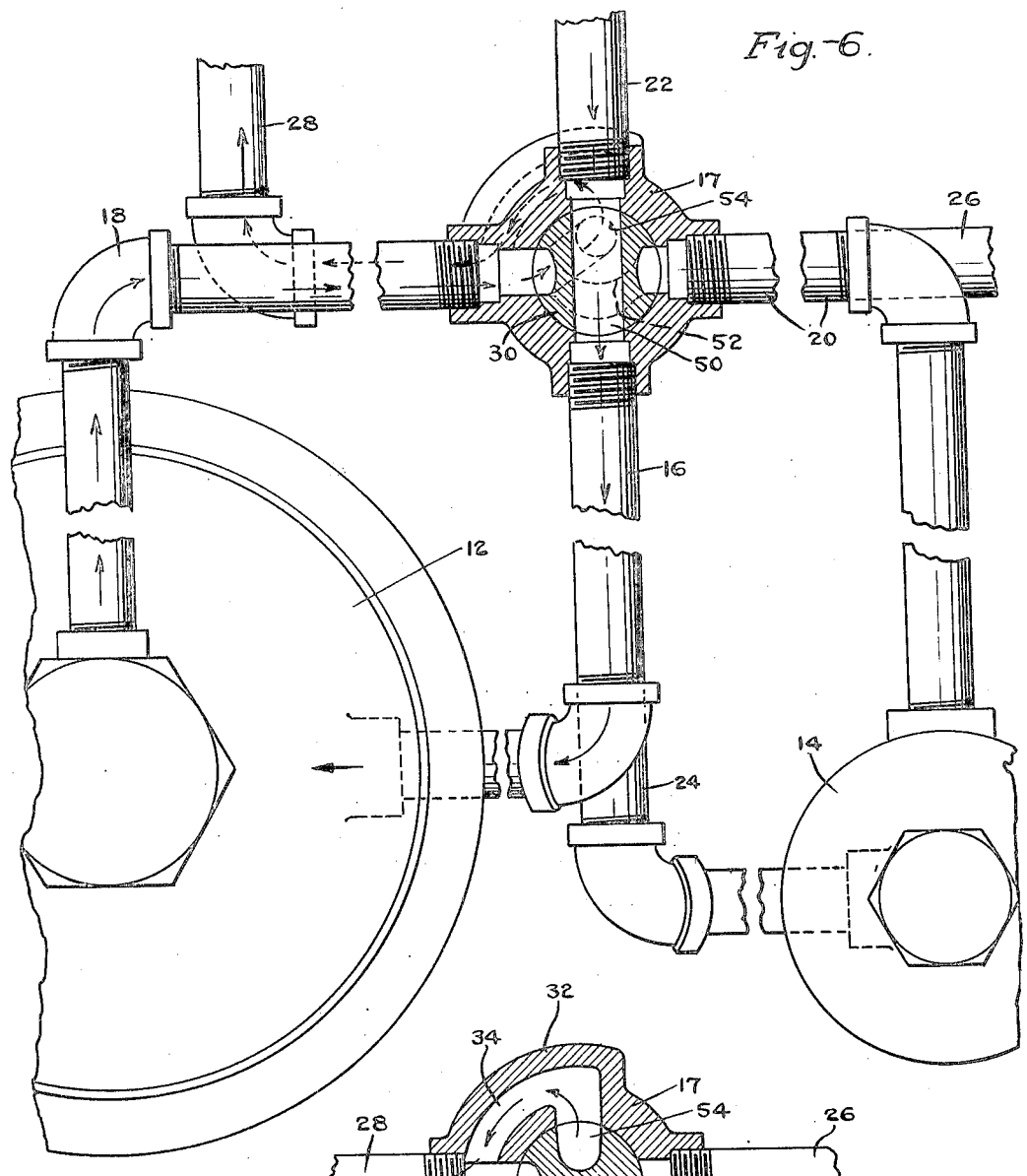

Inventors:
S. G. Harwood.
D. Griswold.
By Whiteley and Ruckman
Attorneys.

Patented July 20, 1926.

1,593,300

UNITED STATES PATENT OFFICE.

STANLEY G. HARWOOD AND DONALD GRISWOLD, OF MINNEAPOLIS, MINNESOTA.

VALVE MECHANISM FOR WATER-SOFTENING SYSTEMS.

Application filed March 7, 1925. Serial No. 13,829.

Our invention relates to valve mechanism for water softener systems and an object is to provide mechanism including a single shiftable valve having ports so arranged that when the valve is in one position the water passes from the water supply main thru the water softener to the service pipe of the water supply system; when the valve is in another position water passes from the water supply main thru a regenerating device and then thru the water softener without passing into the service pipe for causing the first stage in regeneration; when the valve is placed in still another position water passes from the water supply main thru the water softener without passing into the service pipe for completing the regeneration; and when the valve is moved to its original position, the apparatus is again ready to continue the water softening operation. A principal object therefore is to produce a device by means of which the regenerating operation is simplified and readily performed without likelihood of error since the operator can always tell at a glance at the position of the valve whether it is set for service or whether it is set for one or the other of the steps of the regenerating operation.

The full objects and advantages of our invention will be understood in connection with the detailed description thereof and the novel features embodied in our inventive idea will be particularly pointed out in the claims.

Figure 8:
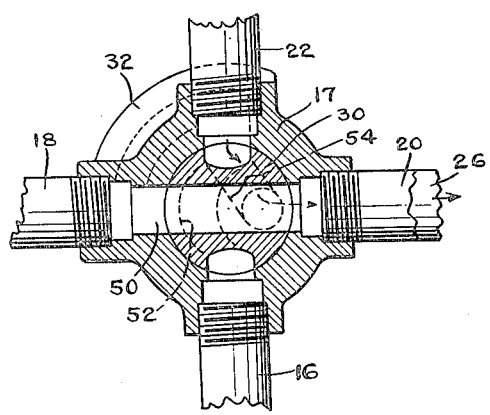
Figure 9:
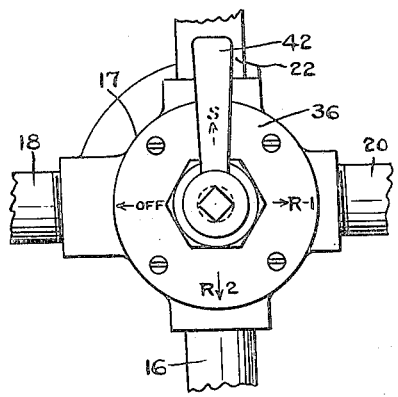
Figure 10:
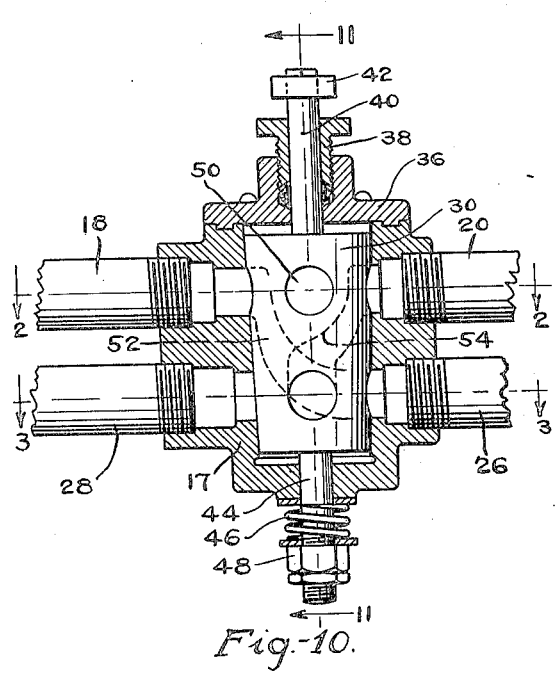
Figure 11:
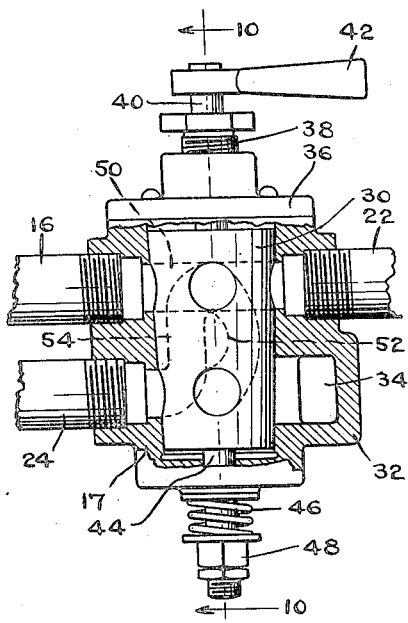

In the accompanying drawings which illustrate one form in which our invention may be embodied, Fig. 1 is an elevational view showing our invention applied to a water softener system. Fig. 2 is a top plan view with the valve mechanism shown in horizontal section on the line 2—2 of Fig. 10. Fig. 3 is a view of the valve mechanism in horizontal section on the line 3—3 of Fig. 10. Fig. 4 is a view corresponding to Fig. 2 but showing the valve turned thru 90 degrees from its position in that figure. Fig. 5 is a view corresponding to Fig. 3 but showing the valve turned thru 90 degrees from its position in that figure. Fig. 6 is a view corresponding to Fig. 2 but showing the valve turned thru 180 degrees from its position in that figure. Fig. 7 is a view corresponding to Fig. 3 but showing the valve turned thru 180 degrees from its position in that figure. Fig. 8 is a view of the valve in horizontal section corresponding to Fig. 2 but showing it turned thru 270 degrees from its position in that figure. Fig. 9 is a top plan view of the valve. Fig. 10 is a view showing the valve casing in vertical section on the line 10—10 of Fig. 11, the valve being shown in side elevation. Fig. 11 is a view showing the valve casing in vertical section on the line 11—11 of Fig. 10, the valve being shown in side elevation.

As shown in the drawings, our mechanism is applied in a water softener system having a softener tank 12 and a regenerator or salt pot 14. A pipe 16 leads into the bottom of the tank 12 from the upper portion of a valve casing 17. A pipe 18 leads from the top of the tank 12 and extends into the upper portion of the valve casing 17 at a point 90 degrees from the connection of the pipe 16 with the casing. A pipe 20 connects the top of the salt pot 14 with the upper portion of the valve casing 17 at a point diametrically opposite the connection for the pipe 18. A water supply pipe 22 leads into the upper portion of the valve casing at a point diametrically opposite the connection of the pipe 16. A pipe 24 connects the bottom of the salt pot with the lower portion of the valve casing 17. A water service pipe 26 leads from the lower portion of the valve casing directly underneath the pipe 20 and from a point 90 degrees from the connection of the pipe 24. A waste pipe 28 leads to a sewer or drain from the lower portion of the valve casing at a point diametrically opposite the connection of the pipe 26. The valve casing 17 as will be apparent from Figs. 10 and 11 contains a tapered chamber in which a tapered cock or plug valve 30 is rotatably mounted. In addition to this chamber, the valve casing on its lower portion is provided with an outward bulge 32 which contains a by-pass passage 34 which extends for 90 degrees from the connection with the pipe 28 to a point beneath the water supply pipe 22. The top wall of the valve casing is formed by a cover 36 carrying a packing gland 38 thru which the valve stem 40 extends. This stem may be turned by any suitable means in order to rotate the valve to the desired extent. In the embodiment shown, a handle 42 is secured to the upper end of the stem for this purpose. As shown, the valve 30 is provided with a lower stem 44 which extends thru the bottom wall of the casing and is surrounded by a coiled spring 46 interposed between the casing and a nut 48 on the stem so that the valve is held resiliently downward in the tapered valve chamber. The plug valve 30 is provided with three ports which will now be referred to. A horizontal port 50 extends diametrically thru the upper portion of the valve. A port 52 extends between an upper point and a lower point on the surface of the valve, these two points being 180 degrees apart around the valve. As will be apparent from Figs. 10 and 11, the port 52 during its passage thru the valve is curved both lengthwise and laterally of the valve. A port 54 extends between an upper point and a lower point on the surface of the valve, these two points being 90 degrees apart around the surface of the valve. The port 54 during its passage thru the valve is curved as shown in Figs. 10 and 11 so that none of the three ports intersect each other. The upper point of the port 52 is midway between the two ends of the horizontal port 50 and its lower point is directly underneath the upper point of the port 54. The upper point of the port 54 is diametrically opposite the upper point of the port 52 and its lower point is directly underneath one of the ends of the horizontal port 50. All of this is clearly indicated in Figs. 10 and 11 and the connections which are made by the respective ports for different positions of the valve are clearly shown in Figs. 2 to 8. As shown in Fig. 9 the cover plate 36 is provided with indicating marks so that the position of the valve may be readily known at all times.

The operation and advantages of our invention will now be readily understood. In Figs. 2 and 3 of the drawings which represent the first or initial position of the valve, water from the supply pipe 22 enters at the upper portion of the valve casing and goes thru the horizontal port 50 into the pipe 16 to the bottom of the tank 12 and from the top of this tank thru the pipe 18 into the upper end of the port 52 and out of the lower end of this port into the service pipe 26, as indicated by the arrows. During its upward passage thru the softener tank 12, the water is softened in manner well known in the art. When the softening material in the tank 12 has reached the point where it needs regenerating, the handle 42 is turned clockwise thru 90 degrees into the position marked R¹ in Fig. 9, so that the valve is in the position shown in Figs. 4 and 5. Water from the supply pipe 22 then enters at the upper portion of the side wall of the valve casing into the upper end of the port 52 and out of the lower end of this port into the pipe 24 as indicated by dotted arrows in Fig. 4 to the bottom of the salt pot 14 and from the top of the salt pot thru the pipe 20 and horizontal port 50 into the pipe 18 to the top of the softener tank 12 from the bottom of which it passes thru the pipe 16 into the upper end of the port 54 and out of the lower end of this port into the waste pipe 28. During its passage thru the salt pot, the water takes up some of the salt and the brine thus produced passes downwardly thru the softener tank and removes the lime and magnesia salts which were extracted by the softening material. When this portion of the regenerating operation has been continued for the proper length of time, the handle 42 is turned thru another 90 degrees into the position marked R² in Fig. 9, so that the valve is in the position shown in Figs. 6 and 7. Water from the supply pipe 22 then enters at the top of the valve casing and goes thru the horizontal port 50 into the pipe 16 to the bottom of the tank 12 and from the top of this tank thru the pipe 18 into the upper end of the port 54 and out of the lower end of this port into the by-pass 34 and waste pipe 28. When the salt has been washed out of the softening material, the valve is turned back to its original position and the device is again ready to continue the softening of the water for the pre-determined period of time until regeneration is again necessary. It will be noted that a fourth position designated "off" is shown in Fig. 9. When the handle 42 is moved to this position, the valve occupies the position shown in Fig. 8. Water from the supply pipe 22 then enters at the upper portion of the valve casing into the upper end of the port 54 and out of the lower end of this port, directly into the service pipe 26. In this position of the valve water is shut off both from the softener tank and the salt pot. This position is not ordinarily used, but if repairs are being made, water can still be obtained although in an unsoftened condition.

We claim—

1. A valve mechanism comprising a valve casing having a plurality of openings in its wall, and a rotatable valve in said casing having three ports therethrough, one of said ports extending through said valve perpendicular to the axis thereof, and the other two ports extending diagonally to the axis thereof, each of said diagonal ports having one of its ends lying in the same plane as said first mentioned port and the other end lying in a different plane, and said ports registering with different ones of said openings for different positions of said valves.

2. A valve mechanism comprising a valve casing having a plurality of openings in its wall, and a rotatable valve in said casing having three ports therethru, one of said ports extending thru said valve perpendicular to the axis thereof near one end thereof, and the other two ports extending between points located near the respective ends of said valve, the two ports at one end of said valve lying in the same plane as said first mentioned port and said ports registering with different ones of said openings for different positions of said valve.

3. A valve mechanism comprising a valve casing having a plurality of openings in its wall, and a rotatable valve in said casing having three ports therethru, one of said ports extending thru said valve perpendicular to the axis thereof, another of said ports extending between points near the respective ends of said valve, said points being 180 degrees apart around said valve, and the other of said ports extending between points near the respective ends of said valve, said last mentioned points being 90 degrees apart around said valve, said ports registering with different ones of said openings for different positions of said valve.

4. A valve mechanism comprising a valve casing having a plurality of openings in its wall, and a rotatable valve in said casing having three ports therethru, one of said ports extending thru said valve perpendicular to the axis thereof, near one end thereof, another of said ports extending between points near the respective ends of said valve, said points being 180 degrees apart around said valve and one of said points being midway between the ends of said perpendicular port, and the other of said ports extending between the points near the respective ends of said valve, said last mentioned points being 90 degrees apart around said valve and one of said points being diametrically opposite one of the points of said second port and the other of said points having the same angular position around said valve as one of the ends of said perpendicular port, said ports registering with different ones of said openings for different positions of said valve.

5. A valve mechanism comprising a valve casing having a plurality of openings in its wall, near one end thereof and a plurality of openings in its wall near the other end thereof, and a rotatable valve in said casing having three ports therethru, one of said ports extending thru said valve perpendicular to the axis thereof and the other two ports extending between points located near the respective ends of said valve, the ends of said perpendicular port and one of the ends of each of said last mentioned ports being adapted to register in succession with one of said sets of openings and the other ends of said last mentioned ports being adapted to register in succession with the other set of openings.

6. A valve mechanism comprising a valve casing having four openings in its wall near one end thereof and three openings in its wall near the other end thereof, and a rotatable valve in said casing having three ports therethru, one of said ports extending thru said valve perpendicular to the axis thereof and the other two ports extending between points located near the respective ends of said valve, the ends of said perpendicular port and one of the ends of each of said last mentioned ports being adapted to register in succession with said four openings and the other ends of said last mentioned ports being adapted to register in succession with said three openings.

7. A valve mechanism comprising a valve casing having four openings in its wall near one end thereof and three openings in its wall near the other end thereof, and having a by-pass in its wall extending from one of said last mentioned openings partway around to another one thereof, and a rotatable valve in said casing having three ports therethru, one of said ports extending thru said valve perpendicular to the axis thereof and the other two ports extending between points located near the respective ends of said valve, the ends of said perpendicular port and one of the ends of each of said last mentioned ports being adapted to register in succession with said four openings and the other ends of said last mentioned port being adapted to register in succession with said three openings and said by-pass.

In testimony whereof we hereunto affix our signatures.

STANLEY G. HARWOOD.
DONALD GRISWOLD.